W. A. GREAVES.
GEARING.
APPLICATION FILED MAR. 6, 1909.
1,010,748.
Patented Dec. 5, 1911.
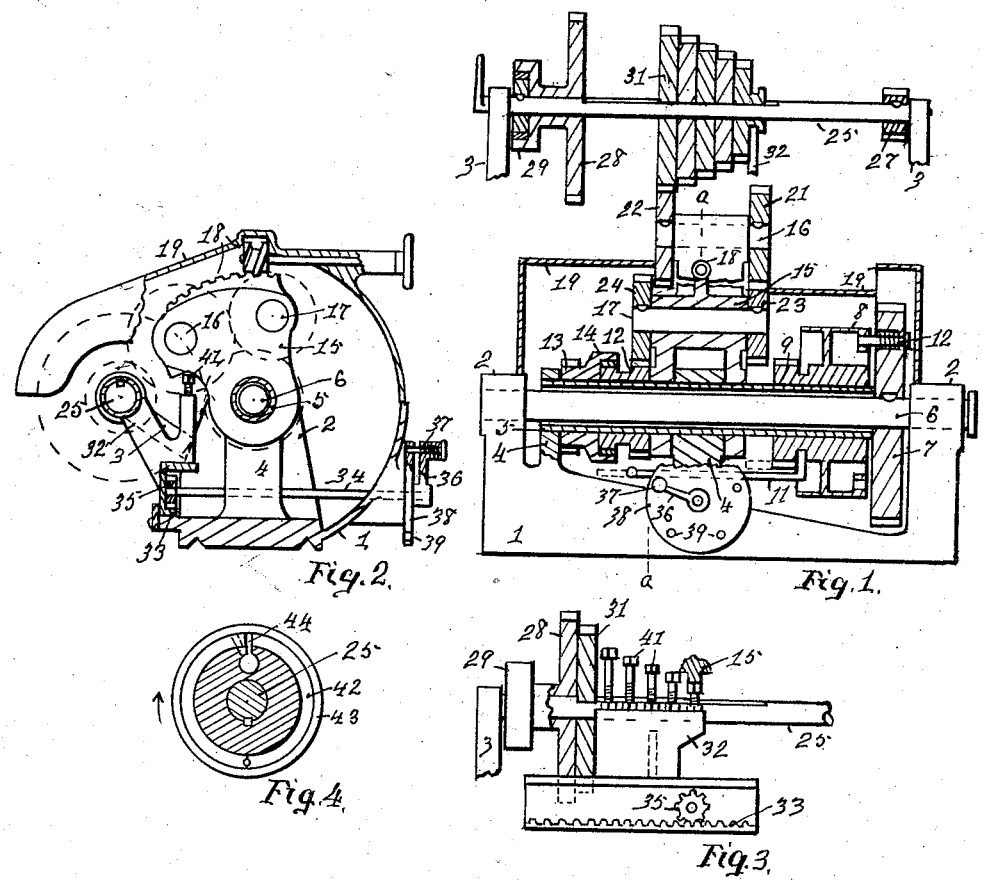
Witnesses,
Samuel S. Carr
Jno. O'Byrne
William Allen Greaves, Inventor
By Robert S. Carr, Atty.

UNITED STATES PATENT OFFICE.

WILLIAM ALLEN GREAVES, OF CINCINNATI, OHIO, ASSIGNOR TO GREAVES, KLUSMAN & CO., OF CINCINNATI, OHIO, A COPARTNERSHIP.

GEARING.

1,010,748.    Specification of Letters Patent.    Patented Dec. 5, 1911.

Application filed March 6, 1909. Serial No. 481,782.

*To all whom it may concern:*

Be it known that I, WILLIAM A. GREAVES, a citizen of the United States, residing at Cincinnati, Ohio, have invented a new and useful Improvement in Gearing, of which the following is a specification.

My invention relates to gearing of the class adapted to engine lathes or other suitable purposes, and the objects of my improvements are to relieve the spindle of all the usual connecting parts with the other members; to provide an independent support concentric with the spindle for said connecting parts; to provide adjustable means for regulating the mesh of the intermediate gear with the back gear cone; to provide means for securing the intermediate gear in proper engagement with the back gears to prevent chattering; to provide co-acting automatic friction clutches for permitting the spindle to be driven in a reverse direction, and to provide compact and durable construction and assemblage of parts for securing facility of operation and efficiency of action. These objects are attained in the following described manner as illustrated in the accompanying drawings, in which:—

Figure 1 is a diagrammatic view with parts in front elevation and parts in section of a gearing embodying my improvements; Fig. 2 an end elevation with parts in section on the line $a$—$a$ of Fig. 1, Fig. 3, a front elevation of the sliding carriage with adjustable stops for the intermediate gear tumbler, and Fig. 4, a transverse section of an automatic friction clutch.

In the drawings, 1 represents the supporting frame formed with bearings 2 and 3 and with intermediate supports 4 wherein a sleeve 5 is secured. The spindle 6 provided with the usual gear 7 and journaled in bearings 2 concentric with sleeve 5 is extended therethrough without contact for preventing any binding or frictional contact with the sleeve by the spindle when deflected laterally under the strain of heavy work. The driven pulley 8, provided with a spur gear 9, is idly mounted on the sleeve adjacent to the spindle gear 7 and is also movable longitudinally thereon by means of the usual shifter 11. A spring actuated pin 12 on gear 7 is adapted to detachably engage the pulley 8 therewith when desired. Spur gears 12 and 13 mounted to turn on sleeve 5 may be automatically secured to turn together by means of the friction clutch 14 (shown in Fig. 4). A tumbler 15 provided with shafts 16 and 17 is rotatively adjustable on sleeve 5 by means of the worm and gear connection 18 therewith and with the stationary hood 19. Shaft 16 carries spur gears 21 and 22 and shaft 17 is provided on one end with a spur gear 23 in continuous engagement with gear 21 and on the other end with gear 24 in continuous engagement with gear 12. The back gear shaft 25 journaled in bearings 3 in the usual manner is provided with a pinion 27 adapted to engage with the spindle gear 7 and with an idle gear 28 adapted to engage with gear 13. A friction clutch 29 similar to, but the reverse of clutch 14 serves to automatically engage gear 28 to turn with the shaft 25. A cone of gears 31 splined on shaft 25 is longitudinally adjustable thereon by means of a shifter 32 which is formed with a toothed rack 33 and slidably mounted in the supporting frame 1. A shaft 34 journaled in the frame is provided on one end with a pinion 35 in engagement with said rack and on the other end with a crank arm 36 which carries a spring plunger 37. A disk 38 formed on the supporting frame is provided with holes 39 for the engagement therewith of the plunger 37. Said holes correspond with the respective cone gears 31 and serve to lock the shifter with said respective gears successively in the proper position to be engaged with gear 22 on the tumbler 15. A series of stops 41 corresponding to the respective gears 31 are adjustably secured on the sliding shifter 32 for intercepting the tumbler at predetermined different points in its movement for properly engaging the gear 22 with either of the gears 31 for driving the spindle at different speeds. In the friction clutch shown in Fig. 4 the friction ring 42 is expanded into frictional engagement with the wall 43 by means of the automatic movement of the pivoted dog 44 at an angle to the radius passing therethrough when the shaft is turned in the direction of the arrow. When the direction of the shaft is reversed, the dog resumes a radial position as shown, and thereby releases the frictional engagement of ring 42 with wall 43.

In operation, the spindle may be driven directly by the engagement of the pulley with the spindle gear, as shown in Fig. 1.

By sliding the pulley on the sleeve out of engagement with the spindle gear and with the gear 9 thereon into engagement with gear 23, motion is communicated to the spindle gear through shaft 17, gear 24, gear 12, clutch 14, gear 13, gear 28, clutch 29, shaft 25, and pinion 27. By continuing the engagement of gear 9 with gear 23 and adjusting the tumbler in contact with the proper stop 41 with gear 22 into engagement with the corresponding gear of cone gears 31, motion may be communicated to the spindle gear through shaft 25 and pinion 27. The engagement of gear 22 with either of the gears 31 drives shaft 25 at a greater speed than the idle gear 28 thereon is driven by gear 13, and clutch 29 is thereby disengaged and clutch 14 remains the driver of gears 13 and 28.

Having fully described my improvements, what I claim as my invention and desire to secure by Letters Patent of the United States is:—

1. A gearing comprising a support, a spindle and a shaft journaled therein, gear connections between them, a cone of gears splined on the shaft, a tumbler adjustable in an arc concentric with the spindle, a driven tumbler gear thereon for separately engaging with any of the cone gears, and automatic clutch and gear connections from the tumbler gear with the shaft.

2. A gearing comprising a spindle, a tumbler supported independently of and concentric therewith, means for moving and maintaining the tumbler in predetermined rotative positions in relation to the spindle, and driven change gear connections between the tumbler and the spindle.

3. A gearing comprising a spindle, a sleeve independently supported concentric therewith, a tumbler rotatively adjustable on the sleeve, a tumbler gear, a driven gear mounted to turn on the sleeve and arranged to detachably engage with the tumbler gear, detachable connections from said driven gear with the spindle, and change speed gear connections from the tumbler gear with the spindle, whereby the spindle may be driven in unison with the driven gear or at different speeds therefrom through the tumbler gear and its connections with the spindle alternately.

4. A gearing comprising a support, a spindle and a shaft journaled therein, gear connection between them, a driving gear, change speed gear connection therefrom with the shaft, and automatic clutch and gear connection from the driving gear with the shaft.

5. In a gearing, the combination of a spindle gear, a back gear shaft provided with a pinion detachably engaging therewith, a driven gear, and gear and automatic clutch mechanism engaging the back shaft therewith.

6. A gearing comprising a spindle, a spindle gear, a tumbler rotatively adjustable concentric with the spindle, a tumbler gear thereon, detachable change speed gear connections between the spindle gear and tumbler gear, and a driven gear movable into engagement alternately with said tumbler gear and spindle gear.

7. In a gearing the combination with a spindle a spindle gear, a back gear shaft, a pinion thereon engaging with the spindle gear, and a cone of gears splined on said shaft of a tumbler concentric with the spindle, a gear thereon adapted to detachably engage with the respective cone gears and driven connections adapted to alternately engage with the spindle gear and the tumbler gear.

8. A gearing comprising a back shaft, a cone of change gears splined thereon, a sliding shifter for the cone, adjustable stops thereon corresponding to the respective gears of the cone, a tumbler pivotally mounted at a fixed point and arranged to engage with either of the stops, and a driven gear carried by the tumbler and adapted to engage with the corresponding gear of the cone.

9. A gearing comprising a back shaft, a cone of gears splined thereon, a shifter for the cone, stops thereon corresponding to the respective gears of the cone, means for moving and maintaining the shifter with the cone and the stops in predetermined relative positions, a live spindle a tumbler rotatively adjustable in relation thereto for contacting with either of the stops, and a gear thereon arranged to detachably engage with the corresponding gear of the cone.

10. In a gearing, the combination of a spindle, a spindle gear, a back gear shaft, a pinion thereon engaging with the spindle gear, a cone of gears splined on said shaft, a tumbler, a tumbler gear movable thereby into engagement with either of the cone gears, automatic clutch connections between said tumbler gear and shaft, and driven connections adapted to alternately engage with the tumbler gear and spindle gear.

WILLIAM ALLEN GREAVES.

Witnesses:
H. H. KLUSMAN,
W. J. HODGSON.